US009514534B2

(12) United States Patent
Dunn et al.

(10) Patent No.: US 9,514,534 B2
(45) Date of Patent: Dec. 6, 2016

(54) DYNAMIC MOVEMENT ASSESSMENT SYSTEM AND METHOD

(71) Applicant: Accelerated Conditioning and Learning, LLC, Nashville, TN (US)

(72) Inventors: Ella Haile Dunn, Nashville, TN (US); Trent Ray Nessler, Birmingham, AL (US)

(73) Assignee: Accelerated Conditioning and Learning, LLC, Nashville, TN (US)

( * ) Notice: Subject to any disclaimer, the term of this patent is extended or adjusted under 35 U.S.C. 154(b) by 0 days.

(21) Appl. No.: 15/102,567

(22) PCT Filed: Dec. 31, 2014

(86) PCT No.: PCT/US2014/072930
§ 371 (c)(1),
(2) Date: Jun. 8, 2016

(87) PCT Pub. No.: WO2015/103359
PCT Pub. Date: Jul. 9, 2015

(65) Prior Publication Data
US 2016/0300347 A1    Oct. 13, 2016

Related U.S. Application Data

(60) Provisional application No. 61/923,072, filed on Jan. 2, 2014.

(51) Int. Cl.
*G06K 9/00* (2006.01)
*G06T 7/00* (2006.01)
*G06T 7/20* (2006.01)

(52) U.S. Cl.
CPC ......... *G06T 7/0012* (2013.01); *G06T 7/2033* (2013.01); *G06T 2207/10016* (2013.01); *G06T 2207/20076* (2013.01); *G06T 2207/30196* (2013.01)

(58) Field of Classification Search
None
See application file for complete search history.

(56) References Cited

U.S. PATENT DOCUMENTS

| 6,236,737 B1 | 5/2001 | Gregson |
| 2004/0219498 A1 | 11/2004 | Davidson |
| 2009/0220124 A1 | 9/2009 | Siegel |
| 2013/0028491 A1* | 1/2013 | Stephenson ........ A63B 24/0003 382/128 |

FOREIGN PATENT DOCUMENTS

| KR | 1020070074074 A | 7/2007 |
| KR | 1020120031757 A | 4/2012 |

OTHER PUBLICATIONS

International Search Report for International Patent Application No. PCT/US2014/072930, dated Mar. 25, 2015.

* cited by examiner

*Primary Examiner* — Atiba O Fitzpatrick
(74) *Attorney, Agent, or Firm* — Patterson Intellectual Property Law, P.C.; Gary L. Montle

(57) ABSTRACT

A system and method implements video capture technology, in combination with computer program engines and proprietary algorithms to capture, analyze and objectively score human movement, and to identify, differentially diagnose and assess the root causes of observed pathokinematic (pathological movement) patterns. The system calculates demographic risk of injury and compares with identified movement issues to determine potential performance issues and associated relative risks for the subject. Specific, individualized corrective measures or interventions are selected and targeted to the individual and his or her movement patterns, to improve those pathokinematics. The result is decreased likelihood of certain types of lower extremity injuries, faster and more effective rehabilitation, the reduction of movement related pain, and significant improvement on specific performance based metrics used in activities and professions requiring athleticism, and quality measurement of the quality of normal "activities of daily living".

20 Claims, 4 Drawing Sheets

DYNAMIC MOVEMENT ASSESSMENT SYSTEM AND METHOD

TECHNICAL FIELD

The present disclosure relates generally to a system and method for dynamic movement assessment. More particularly, this disclosure relates to a comprehensive methodology for assessing movement and implementing interventions with respect to diagnosed root causes of movement deviations that negatively impact performance and lead to injury.

BACKGROUND ART

Systems and methods as disclosed herein are intended to address existing problems in the fields of physical therapy, other kinds of rehabilitative medicine, athletic training, orthopaedics, podiatry, chiropractics, coaching, personal training, strength and conditioning, health insurance, worker's compensation, ergonomics and workplace safety, the military and other tactical fields, including first responders, sports and athletics and finally, those who teach in these and related fields.

It is very difficult, and therefore rarely undertaken, to accurately capture iterative human motion in a manner that can be studied and analyzed, assess and objectively quantify that human movement, identify pathological movement patterns, (or pathokinematics), diagnose the root cause(s) of those pathokinematics, and apply corrective interventions to change and ultimately improve or eliminate them. This has been a barrier to improvement in the areas injury prevention, rehabilitation of injury when it has occurred, and the mitigation of pain and improvement in performance.

Because human movement is extremely complex and controlled by multiple systems in the body and brain, most of those seeking injury prevention, fast and effective rehabilitation and performance improvement, make assumptions about an individual's movement patterns based on others/previous experience, static body position, post-surgical instructions for returning an individual to a basic level of function, and perhaps the naked eye while the person is in a laboratory setting. For those lucky enough to have access to a biomechanical laboratory, (which is inaccessible to most of the population), often too much data and information is generated to be useful to most people, back on the job, on the field, or during the game. Today it is impractical (at best) for those in the field to look at, record and adequately assess people in motion, doing what they do: be that sports, sitting, squatting and so forth; and there currently does not exist an algorithm built to assess that movement (if it were captured), diagnose the underlying causes of poor movement patterns that lead to injury and limit performance, drive decisions about what observed movements mean, nor apply the appropriate correctives to address deficits or limitations.

When coaching for performance, attempting to strengthen to prevent injury, or rehabilitating an injury, it is impossible to measure the success of our interventions, and healthcare dollars spent, if we do not have an objective record of the "before" and "after" patient, athlete or subject. Add to that the difficulty of instructing patients, athletes and subjects without visual information and explanation; the time it takes to do it if undertaken; and the relationship between a subjects' understanding of the problem and the changes required to fix it, and his or her compliance with the instructions of the medical practitioner, coach or caregiver, the likelihood of being able to prevent or rehabilitate successfully an injury using traditional coaching methodologies becomes exceedingly low, and tracking injury prevention to rehabilitative methods becomes a matter of educated guesswork rather than scientific correlation.

It would therefore be desirable to provide a system and method to capture movement while it is happening, play it back for the subject by way of education and understanding of the corrective plan being prescribed, and measure and prove the success or efficacy of interventions.

DISCUSSION OF THE INVENTION

In accordance with one aspect of the present disclosure, a system and method may implement two dimensional and/or three dimensional video technology, in combination with computer processing, program engines and proprietary algorithms to capture, analyze and objectively score human movement, and to identify, differentially diagnose and assess the root causes of observed pathokinematic (pathological movement) patterns. The system and method further selects and recommends specific, individualized corrective measures or interventions targeted to the individual and his or her movement patterns, to improve those pathokinematics.

The result is decreased likelihood of certain types of lower extremity (from the pectoral muscle group and down) injuries, faster and more effective (and therefore less costly) rehabilitation, the reduction and/or elimination of movement related pain, and significant improvement on specific performance based metrics used in both sports/athletics (and activities and professions requiring athleticism) and the measurement of the quality of normal "activities of daily living" according to commonly accepted healthcare practice.

The method itself (in one particular embodiment) includes a series of six essential movements, performed by a subject in a specific order, which progressively taxes the neurological, musculoskeletal, cardiovascular, and other physiological systems of the body, with increasing difficulty. It is conducted in sequence, without rest, with specific instructions to the subject, using certain exercise equipment or other devices that can stand in for that equipment. A specific number of repetitions are performed for each movement while the subject is being videotaped from different angles, using either 2D or 3D technology. Alternative embodiments may employ non-videographic image capture methods, such as the recording of a series of still images via an image capture device. In one embodiment, the same test includes an added front-end Fatigue Protocol, which is used with the more highly trained or fit subject, to tax his or her system in advance of the test, in order to identify movement patterns under stress or fatigue conditions, more like those that occur in sports later in the game, or in other activities such as military or tactical operations when the individual is under stress, sleep or nutritionally depleted conditions and the like.

The set-up of the space for the test is prescribed using a specific protocol for the purpose of ensuring valid results over time, as well as repeatability and inter and intra rater reliability. Each repetition is scored individually, and scores are calculated using aggregate, mean and median scores, as well as other statistically important metrics. An overall risk rating is calculated, as well as a summary score which can be used to measure progress and provide specific feedback to the subject and those working with him or her to improve and/or eliminate pathokinematics.

A report is generated using photographs and verbal descriptions of each of the essential movements which is given to the patient, his or her caregivers/coaches/parents, and others involved in the care or teaching of the subject.

The report shows the "worst case" photo for each movement, describes any observed pathokinematics, provides scores, and assigns specific correctives targeted to that individual, his or her movement deficiencies/deficits, with instructions for frequency and methods of performing them. A copy (electronic or paper) can be generated and placed in the medical record, electronic or other kinds, sent to insurance carriers for the purpose of billing, other kinds of physicians or members of the medical or sports performance improvement team.

Demographic data may preferably be collected at the start of the test. A system and method as disclosed herein may preferably include a proprietary database and a list of key questions to capture key data for each subject, which is then used via a decision-driving algorithm also developed by the inventors. The algorithm, in short, takes all input from the other program engines and associated data repositories for the system as well as additional input by the evaluator, analyzes the findings, chooses a decision(s) based on the meaning of that input in aggregate, and selects specific correctives to be applied to correct the root cause(s) of the pathological movement patterns and other observed biomechanical deficits.

A set of specific and new corrective interventions is also part of the total solution, and it includes exercises performed in new ways and under new conditions, in a specific order. Techniques used are new, as is the progressive nature of the exercises, designed to increasingly tax the human body and all of its systems, more closely mimicking sport and other activities of life during which movement patterns are more likely to break down and lead to or exacerbate injury, and limit performance.

An important aspect of this disclosure is an embodiment as a web-based and application specific tool that can be downloaded to a PC, laptop, tablet, netbook, or other computer device in part or in total. This embodiment uses web-based, HIPAA compliant computing platforms and tools to perform the entire test, start to finish, to run the algorithm, and to generate reports. A further embodiment includes an e-commerce option. This web-based, computer-implemented embodiment may shorten the time it takes to perform tests; reduce or eliminate the education and skill required by the evaluator, and make testing cost effective and readily available enough to be used en masse.

The data generated by the mass use of the tool will be used to refine and continuously improve the tool itself. Data can be mined for additional development of similar types of biomechanical analyses of the subject, and for other applications outside sports, such as in industry, military, first responders, retail and so forth. Generated data can be also mined for research which will help healthcare and sports professionals (and others) solve problems related to movement, disease states, outcomes, and so forth. Data can be further sliced for analysis based on specific demographics and lifestyle patterns.

BEST MODE FOR CARRYING OUT THE INVENTION

Figure 1:
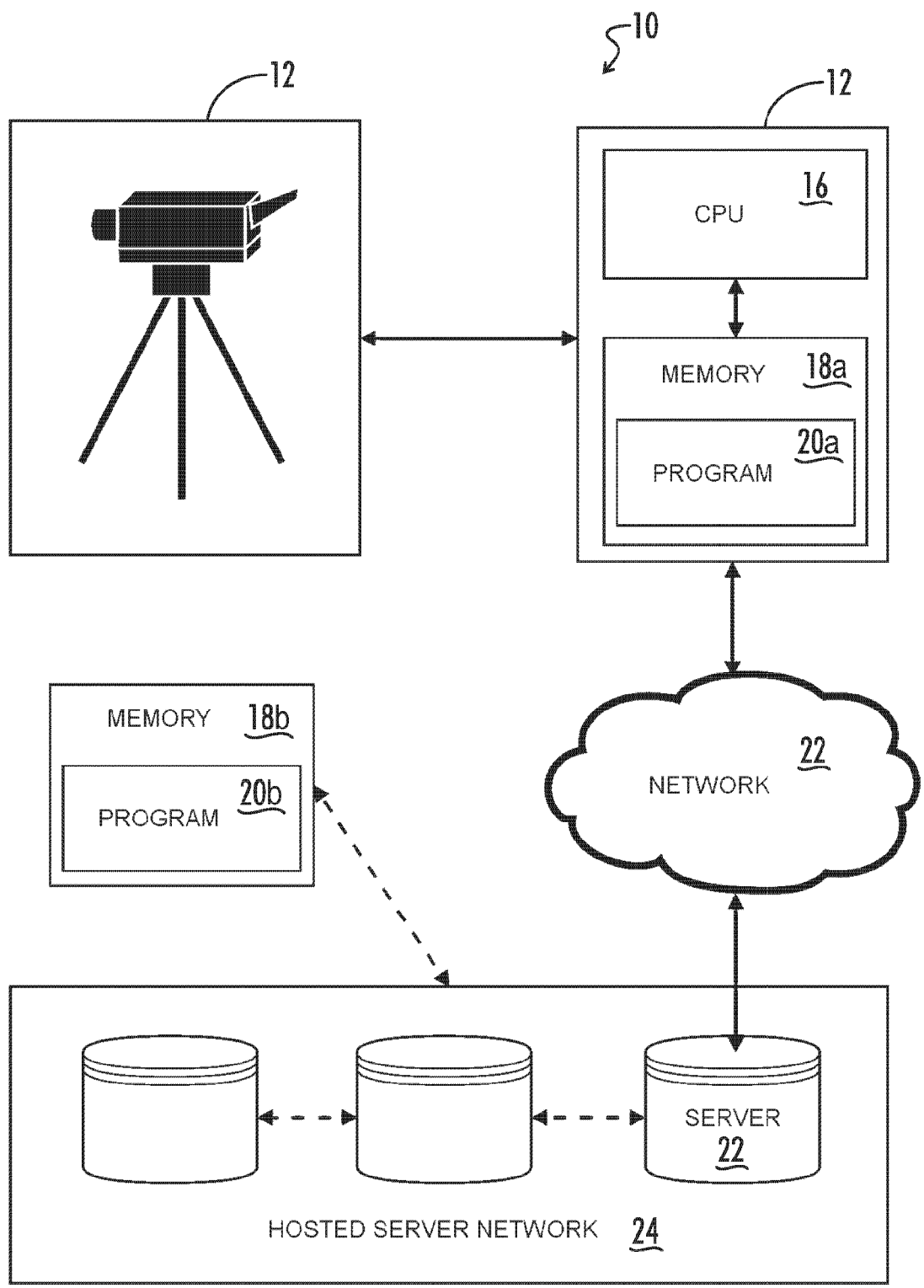
FIG. 1 is a block diagram representing an embodiment of a system according to the present disclosure.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

In accordance with various embodiments of the present disclosure, a system is provided for implementing a comprehensive methodology for dynamic movement assessment. Such a system in one embodiment may include an image capturing device, a user computing device and a back-end server network functionally linked via a communications network. The user computing device may generally be any static or mobile computer such as for example a smart phone, tablet, desktop computer, etc., and may generally further include a processor, a display unit upon which a user interface may be generated in association with a computer program product of the host system and method, and memory and/or storage media upon which resides a program product or portion thereof for execution of certain associated elements or steps in a method as described herein. The user computing device and one or more hosted servers in the server network may collectively include software which upon execution by associated processors are effective to perform the method generally, or alternatively each step in a method of the present disclosure may be directed upon execution of software residing on a single element of the system.

The term "user interface" as used herein may unless otherwise stated include any input-output module with respect to the hosted server network and/or resident storage media including but not limited to web portals, such as individual web pages or those collectively defining a hosted website, mobile desktop applications, telephony interfaces such as interactive voice response (IVR), and the like. Such interfaces may in a broader sense include pop-ups or links to third party websites for the purpose of further accessing and/or integrating associated materials, data or program functions via the hosted system and in accordance with methods of the present disclosure.

The term "communications network" as used herein with respect to data communication between two or more parties or otherwise between communications network interfaces associated with two or more parties may refer to any one of, or a combination of any two or more of, telecommunications networks (whether wired, wireless, cellular or the like), a global network such as the Internet, local networks, network links, Internet Service Providers (ISP's), and intermediate communication interfaces.

The hosted server network may typically include or otherwise maintain a data storage network, multidimensional data repository or the like which includes for example a web-based HIPAA compliant database. In one embodiment, a comprehensive hosted database in association with program steps as further described below may combine a plurality of demographics with deviations captured and outcome measures, exemplary demographics including without limitation age; gender; sport or occupation; years of participation; level of play; previous ACL history; previous orthopedic history; and the like.

Depending on the embodiment, certain acts, events, or functions of any of the algorithms described herein can be performed in a different sequence, can be added, merged, or left out altogether (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable medium known in the art. An exemplary computer-readable medium can be coupled to the processor such that the processor can read information from, and write information to, the memory/storage medium. In the alternative, the medium can be integral to the processor. The processor and the medium can reside in an ASIC. The ASIC can reside in a user terminal. In the alternative, the processor and the medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Image Capturing

In an embodiment of the method, one exemplary step may include capturing image data associated with a predetermined plurality of movement patterns performed by a subject, the movement patterns performed in a predetermined sequence and for a predetermined number of iterations, each pattern associated with one or more variable components.

The term "image" or "image data" as used herein may interchangeably and without limitation unless otherwise stated refer to a single image, a collection of images defining video data or video streams, and the like. Image data processing may include in some examples video playback and individual frame analysis, but may more typically further or in the alternative include more complex forms of Video Analysis as are known in the art for full-motion video data stream review and analysis.

In order to ensure that the results that are recorded and compared with pre/post tests are an accurate reflection on improvement or lack thereof, there may preferably be standardization to the process of capturing the video data. This can be done by implementing an image capturing device and associated video playback and/or video conversion software, such as an HD camera/DF Computer platform, a Dartfish Express App, Kinect 3D, etc. In an embodiment, the image capturing step includes substeps wherein the captured images are automatically collected locally and transmitted as a video data file or data stream across the communications network for remote analysis via program engines residing on the hosted server network.

In one embodiment, a video capturing step is enabled by causing the subject athlete to stand on or remain close to a reference line during the majority of the testing. The athlete must remain within for example a 4' (1.22 m) circumference of the reference line during all testing to ensure accuracy of the measurements. The distance of the image capturing device from the reference line may preferably be 4' to 7' (1.22 m to 2.13 m) to ensure capturing of images for the entire subject (from head to toe) throughout testing. The camera should preferably be level with the horizontal surface and 3 feet from the floor.

It is typically important to keep the step height consistent between tests and re-tests. For clinic purposes a standard clinic step height of 12" (31 cm) may be sufficient, whereas in specific contexts such as for example firefighter evaluations it may be desirable to increase the step height to, e.g., 18" (46 cm). For an athletic training room or performance area, a standard 12" (31 cm) plyometric step may be sufficient. While these step heights may constitute standard protocols, it may be understood that these and other details with respect to test parameters are not intended as limiting on the scope of a system and method as disclosed herein unless otherwise explicitly noted.

The surface upon which the test is being conducted will typically impact the pathokinematics presented. Therefore, this needs to be considered and remain consistent with pre/post test. For most purposes, hardwood, hard rubber flooring or concrete flooring is preferable. Although testing can be performed on grass and mats, it may greatly impact movement patterns and so preferably should remain consistent for each subsequent test.

In a preferred embodiment, the method of the present disclosure is considered to provide a progressive assessment, meaning that each successive test is more difficult than the previous. As such, performing each test feeds into the fatigue of the next test. Therefore, each test needs to be performed in a predetermined order with the progressive nature of the assessment having been considered. There should generally be no rest period between each test, as resting between each test will allow for recovery which may alter or skew the results. The progressive nature of the test also aids to the ability to determine root cause for the movement presented through process of elimination on each successive test.

If pain is experienced, that particular test being performed is stopped and may be scored. Additionally, in the case of exercises such as for example the SLHT, if the form is so poor that the athlete is at risk, this test can be discontinued prior to meeting the prescribed number of repetitions.

In one embodiment, the combination of movement patterns may include a plurality (e.g., six) of essential movements. Although the movements in isolation are not new, the combination of these movements for differential diagnostic purposes is considered to be novel with respect to the known art. The predetermined order of these movements further lends to the differential diagnostic capabilities of the assessment.

In an embodiment, the way in which the movements are performed and the number of repetitions associated with each movement is also relevant to performance of various aspects of the method.

One particular example of the individual movements in the combination of movement patterns may include, without limitation, a Full Squat Test (hereinafter "FST"), a Step-Up Test (hereinafter "SUT"), a Single Leg Squat test (hereinafter "SLST"), a Single Leg Hop test (hereinafter "SLHT"), a Plank Test (hereinafter "PT"), and a Side Plank Test on one or more sides (hereinafter "SPT" or "SPTR" and "SPTL", respectively).

The FST may be chosen due to the fact that squatting is such an essential motion in daily activities, athletics and foundation of strength. Poor performance on this movement will carry over to activities of daily living ("ADL's") as well as athletic performance. It has been well published in the literature that improvement in squat results in improvement in vertical jump. Through progressive testing of this motion the system may be able to identify numerous deviations that have a direct impact on further reinforcing poor movement patterns with ADL's and sports as well as asymmetries.

In one example of a test with respect to the FST, the subject athlete will be asked to perform twenty squats facing toward the examiner. The squat is preferably demonstrated with good technique and depth, and within the athlete's comfort zone. The squat should be demonstrated with good technique (feet shoulder width apart) and good depth. Further instruction may typically be avoided unless the athlete has an extremely narrow base of support.

The SUT may be chosen due to the fact that so many patients must climb stairs in their daily activity, and it is often one of the activities that patients will complain of pain with. The SUT gives a clear indication of what their mechanics look like during the activity, as well as it is a test that gives an idea of asymmetries and single limb performance. The way that this test is performed, the system may be able to identify numerous deviations, impact of endurance on mechanics, further indication of asymmetries as well as whether or not their associated weakness occurs in eccentric or concentric phases of the motion.

In one example of the SUT, the starting position is with both feet on the ground; the athlete will step up with one leg, extend all the way up to full knee extension, tap the opposite foot once the end range has been achieved, and step back with opposite foot. At foot contact and without moving the stationary foot on the step, the motion is repeated immediately for ten repetitions. Once complete, the athlete steps all the way off the step (so both feet are on ground prior to stepping up with opposite foot), then repeats on the opposite side.

The SLST is relevant in that a proportionately large amount of athletics includes single leg activities, and they are shown to be a primary indicator of sports performance and injury risk. Whether it is sprinting, jumping, or cutting maneuvers, stability in this motion is essential. Therefore, assessing the athlete's motion during this exercise may become critical to injury prevention and enhancing performance. If gross asymmetries are present, these will become apparent in the SLST.

In one example of the SLST, the athlete will stand in single leg stance and perform single leg squat to 30-45 degrees (their comfort) for ten repetitions without touching the opposite foot to the ground. This may typically be repeated on the opposite side.

The SLHT may be relevant due to the fact that it represents a movement athletes do repeatedly throughout various sports. We also know that one of the mechanisms for non-contact anterior cruciate ligament ("ACL") injury is cutting and jumping maneuvers, and although this is not exactly the same, the movements seen with those motions will be present with this safer movement. So, assessing the athlete's motion during a movement known to be highly associated with injury may be desirable to see if the movement is present and to assess the impact of interventions with respect to this movement. If there are profound pathokinematics present, the athlete has performed the FAST-FP and/or there are significant asymmetries during the SLST, performance on this test is closely monitored. When monitoring, it may be desirable to make a clinical judgment if continuation of this movement is warranted.

In one example of the SLHT, the athlete will stand in single leg stance with the contralateral limb in hip extension and perform a single leg vertical hop as high as they can for ten repetitions without touching the opposite foot to the ground. This is repeated on the opposite leg.

The plank test is designed to assess the strength and endurance of some of the key core muscles. In one embodiment, it is the primary test to assess the strength and endurance of the multifidus as well as the abdominals and tranverse abdominus. This test can also provide some indication of the balance of the muscles on the anterior aspect (abdominals and associated musculature) and posterior aspect (multifidus and associated musculature as well as proprioception through the lumbar region). Because the core is so active in sports, assessing the ability to perform the test gives an indication of strength of the core as well endurance.

In one example, the PT is performed on elbows with the feet together, neutral pelvic position and neutral cervical spine (looking at the floor). The PT is performed for one minute and is scored on when the athlete's hips drop greater than one inch (2.54 cm) and/or other deviations are present, such as scapular winging, hip hike, trunk rotation, etc., as well as whether or not the athlete can hold the correct position for at least one minute.

The side plank test is designed to assess the strength and endurance of some of the key core muscles. In this embodiment, it is the principal test to assess the strength and endurance of the gluteus medius as well as the obliques and quadratus luborum. This test can also provide some indication of the balance of the muscles on right and left side of the body. Because the core is so active in sports, assessing the ability to perform the test allows the system to properly assess symmetry as well as endurance.

In one example, the SPT is performed on one elbow with the feet together, neutral pelvic position, neutral cervical spine and opposite hand up on hip. The SPT is performed for one minute and each side is scored separately. Score is based on when the athlete's hips drop greater than one inch and/or when other deviations are present, such as hip hike, trunk rotation, foot or other body position adjustment, etc., as well as whether or not the athlete can hold the position for at least one minute. The most enlightening finding on this test is the weakness that is observed in collegiate and pro-athletes despite the fact that this is a routine most of them do as a part of their program, as well as the asymmetry observed.

Scoring of Movement Iterations

Upon capturing image data for the subject, an exemplary method of the present disclosure may further include a step of processing the captured image data to score each iteration of each movement pattern with respect to each of one or more observable deviations from a threshold value associated with each respective variable component, the score based on a magnitude of deviation and a quantity of deviations.

In one embodiment, each movement test is associated with one or more defined observable deviations from a relevant threshold or norm. Although the deviations in isolation may have previously been known in the art, the specific and predetermined combination of these deviations with each associated movement allows for differential diagnostic capabilities.

Further, there are certain deviations that have previously not been identified in the literature with these specific movements that may be desirably implemented with respect to the overall diagnostic capabilities. These include without limitation: Pathokinematics (as used herein a descriptive term used to describe pathological movement associated with a method as disclosed herein); lateral shift (e.g., lateral shift of the pelvis from neutral associated with the FST); trunk rotation (e.g., rotation of the lumbar spine associated with FST); retro-trendelenburg (e.g., a reverse trendelenburg position associated with the SUT, SLST, SLHT, SPTR & SPTL); corkscrewing (e.g., a combination trendelenburg and rotation at the hip that is seen with SUT, SLST, SLHT, SPTR & SPTL).

In one embodiment, the scoring methodology considers both the magnitude of the deviation and the number of deviations. As an example, this may include scoring movement patterns on a 0-3 scale with 0 being the lowest and 3 being the highest. Although there are other movement screens that use this same scale, the methodology behind scoring is unique. Each test has a weighted critical deviation and the magnitude of that deviation that is the main driver of the score. Weighted critical deviations may preferably be calculated with respect to each repetition within a test. These weighted critical deviations may include the magnitude of lateral shift (for FST), the magnitude of adduction of the hip (for SUT, SLST, SLHT), ability to sustain neutral pelvic position for 1 minute period of time (for PT, SPTR, SPTL), etc. Each test's score may alternatively, or in addition to the above deviations, be impacted by a threshold number of additional deviations.

A risk rating is generated by the system based on overall movement score, a cumulative score of the FST, SUT, SLST in combination with the PT, SPTR, SPTL, as well as symmetry during single limb performance (SUT, SLST, SLHT), demographic information (age, gender, BMI, sport), previous orthopedic history and loss of balance. This aids in identifying those at higher risk based on all the factors identified in the research to put athletes at greater risk for injury. In one embodiment, a scoring methodology is based on the repetition with the maximal deviation, but alternatively the system may score every repetition in order to develop a cumulative score (e.g., of 249 (80 reps×3 points possible for each=240+9 points possible to PT/SPT=249)).

A preferred embodiment of a scoring methodology for the FST, SUT, SLST, SLHT, PT, and SPT may be described as follows. For the FST, a single score may be calculated in accordance with the subject's peak power output and average power output over the number of repetitions for the test. For the SUT, SLST, and SLHT, a score may be calculated for each of the left and right legs per each test in accordance with the subject's peak power output and average power output over the number of repetitions for each test. For the PT, a single score may be calculated in accordance with the subject's ability to maintain an ideal plank position over a defined period of time. For the SPT, a score may be calculated for each of the left and right legs in accordance with the subject's ability to maintain an ideal side plank position over a defined period of time. Each test score for the plurality of tests may preferably be based upon the magnitude and number of deviations from the preferred movement during each test.

The scores from the FST, SUT, SLST, SLHT, PT, and SPT may be summed into an overall composite score. An overall composite score percentage may be calculated by dividing the overall composite score with the theoretical maximum value for an overall composite score. The overall composite score may indicate the general and overall power output of each subject with regard to the subject's strength in tested muscle groups to the extent that the subject is able to maintain form throughout the repetitions of each test.

A percentage degree of asymmetry between sides may further be calculated from the individual scores from each side tested in the SUT, SLST, and SLHT. For example, the left side scores of the SUT, SLST, and SLHT may be summed and weighed against the sum of scores from the right side scores of the SUT, SLST, and SLHT, such that the division of the left-side total from the right-side total yields the percentage degree of asymmetry. Other comparative methodologies may be used, such as averaging the for each test left-right division per test as opposed to averaging the sums.

An overall injury risk rating may be calculated from the overall composite score and the degree of asymmetry between sides. In an exemplary calculation method, the degree of asymmetry percentage may be plotted against a weighted distribution curve, the value of said curve then multiplied against the overall composite score. Another exemplary calculation method may include multiplying the inverse of the degree of asymmetry with the overall composite score. The calculation method used should reflect a more preferable score for a higher overall composite score and a lower degree of asymmetry, such that the overall injury risk rating provides an assessment of the potential for injury due to a lack of overall muscle strength and/or a lack of lateral muscular strength contributing to an imbalance between sides.

From the overall injury risk rating, an injury risk rating score may be determined by assigning the score into a category of the degree of risk. For example, risk categories may preferably include: (1) minimal; (1.5) minimal+; (2) mild; (2.5) mild+; (3) moderate; (3.5) moderate+; (4) high; and (4.5) high+. Each category may be associated with a range of overall injury risk rating scores, such that lower scores may be associated with a higher category of risk. Overall injury risk rating values may be evenly distributed across categories, or weighted distributions may be used.

Various scores may contribute to report generation by identifying general risk of injury, possible injuries based on certain muscle weaknesses, possible injuries based upon asymmetrical muscle strength, recommendations for therapies, recommendations for returning to sports, and the like. For example, a return to sport rating may be determined based upon a combination of scoring factors exemplarily including the magnitude of lateral asymmetry between tests, an overall strength rating, and an injury risk rating. Scores may be categorized among report types for each test, such that test reports for each test may demonstrate overall power and/or average power, left lateral power, right lateral power, and degree of asymmetry between lateral sides.

In an embodiment, a return to sports rating may include a plurality of categories corresponding to the degree of recommendation, such as "green light" for recommending return, "yellow light" for cautioning about return, and "red light" for not recommending return. In this example, a "green light" rating may be recommended where the degree of asymmetry percentage is less than 20 percent, and/or an overall composite score falls within an ideal range, and/or an injury risk rating falls within an ideal range. Further, in this example, a "yellow light" rating may be recommended where the degree of asymmetry percentage is equal to thirty or up to forty percent, or an overall composite score falls within a non-deal range, or an injury risk rating falls within a non-ideal range. Likewise, a "red light" rating may be recommended where the degree of asymmetry percentage is 40 percent or greater, or the overall composite score falls within a range of concern, or an injury risk rating falls within a range of concern.

Identifying Root Causes of Pathokinematics

Upon scoring each iteration of each movement pattern in the sequence, the method may continue with a step of probabilistically identifying a causal relationship between one or more pathokinematics and criteria comprising one or more of the deviations and iteration scores.

Generally stated, differential diagnosis capabilities of a system and method according to the present disclosure are derived from several factors, including but not limited to the progressive nature of the examination, the athleticism, type and style of the examination and the associated deviations. As described above, the sequence of the tests may typically be designed to increasingly provide challenge to various and sometimes isolated components of the musculoskeletal system so as to lead to a differential diagnosis. The intensity of the test in combination with the sequence may be designed to assist in highlighting variances in proprioception, strength and endurance. Further, with the noted deviations and cumulative pairing of deviations from previous tests, this leads to a clearer representation of the "root cause" of pathokinematics.

Report and Intervention

Upon identifying one or more causal relationships to pathokinematics, the method may continue with a step of automatic report generation.

The report may be generated within a hosted program or website, or may be electronically transmitted to the user separately from the hosted interface, and may include a number of relevant outputs, examples of which may include without limitation: an overall score on outcome measure; a score for each individual movement; a score for the overall test; the top three injuries the subject may be susceptible to; the top three performance issues the subject may be susceptible to; the top three root causes of the movement dysfunction; the top 3-5 correctives to improve, and the like.

While many of the corrective exercises taken individually may not necessarily be unique, various algorithms implemented by a system and method according to the present disclosure implement key concepts, intervention strategies and exercises in view of the aforementioned steps, including but not limited to one or more of the following.

One general concept is that poor technique equates to poor motor planning equates to poor performance. Another exemplary concept may be Squat Neuromuscular Retraining (SNMR), as derived using steps of a method as disclosed herein and which may desirably be implemented in improvement of the lateral shift. Another concept may be Lumbopelvic DisassociationDisassociation (LPD), as desirable to restoration of the ability to discern hip flexion from lumbar flexion and in restoration of hip proprioception. Super-set, monster-set and mega-set training methodologies are also potential concepts to be implemented in addressing endurance as well as pre-fatiguing primary compensators leading to pathokinematics. There are further several manual interventions that are taught to aid in improving movement and performance. The majority of these are used to increase endurance and stability during key movements and aid in development of both strength and proprioception.

It may be understood that in various embodiments as described herein, a step for probabilistically identifying causal relationships may optimally include review and analysis of previously obtained test results and associated analysis in the context of, or in comparison with, the most current test results. The repeatable nature of the test procedures used in accordance with the present disclosure allows for appropriate review of how technique changes over time and which may for example occur in response to previous interventions. Therefore, a method in accordance with the present disclosure may preferably include steps for confirming or validating an identical or at least sufficiently comparable testing environment and protocols, objective measurement and scoring of test steps with respect to each iteration of the test, identifying change across a plurality of test iterations, measuring the efficacy of interventions over time and across a plurality of test iterations, and providing feedback and/or intervention analysis to a subject with respect to a plurality of test iterations.

Referring generally to FIGS. 1-4, exemplary embodiments may be described herein for a system and method for dynamic movement assessment. Where the various figures may describe embodiments sharing various common elements and features with other embodiments, similar elements and features are given the same reference numerals and redundant description thereof may be omitted below.

Referring more particularly to FIG. 1, an embodiment of system 10 according the present disclosure includes an image capture device 12 operatively connected to a user computing device 14. A preferred embodiment of the image capture device 12 includes a digital video camera able to stream live video feed to the user computing device 14. Alternative embodiments include but are not limited to monoscopic or stereoscopic still image or video capture, using analog or digital recording for live or post-recording processing. Optional embodiments include digital cameras, webcams, smartphone cameras, and the like.

The user computing device 14 may include a processor 16 and a non-transitory, computer-readable memory medium 18a with software instructions 20a residing thereon. In certain embodiments, the processor 16 may execute the software instructions 20a stored on the computer-readable memory medium 16 effective to process the video or image stream received from the image capture device 12.

In certain embodiments, the user computing device 14 may be communicatively connected by means of a communications network 22 to one or more servers 24. The one or more servers 24 may optionally be inter-operatively connected to each other as a hosted server network 26. A preferred embodiment of the hosted server network 26 includes a storage service array such as Amazon S3. The servers 24 or server network 26 may be effective to store one or more of the image data received by the user computing device 14, image processing algorithms, image processing data, iteration scoring thresholds, and image processing subject results.

In one embodiment, the memory medium 18a and program instructions 20a may be alternatively stored in association with the server(s) 24 or server network 26 as opposed to the user computing device 14.

Figure 2:
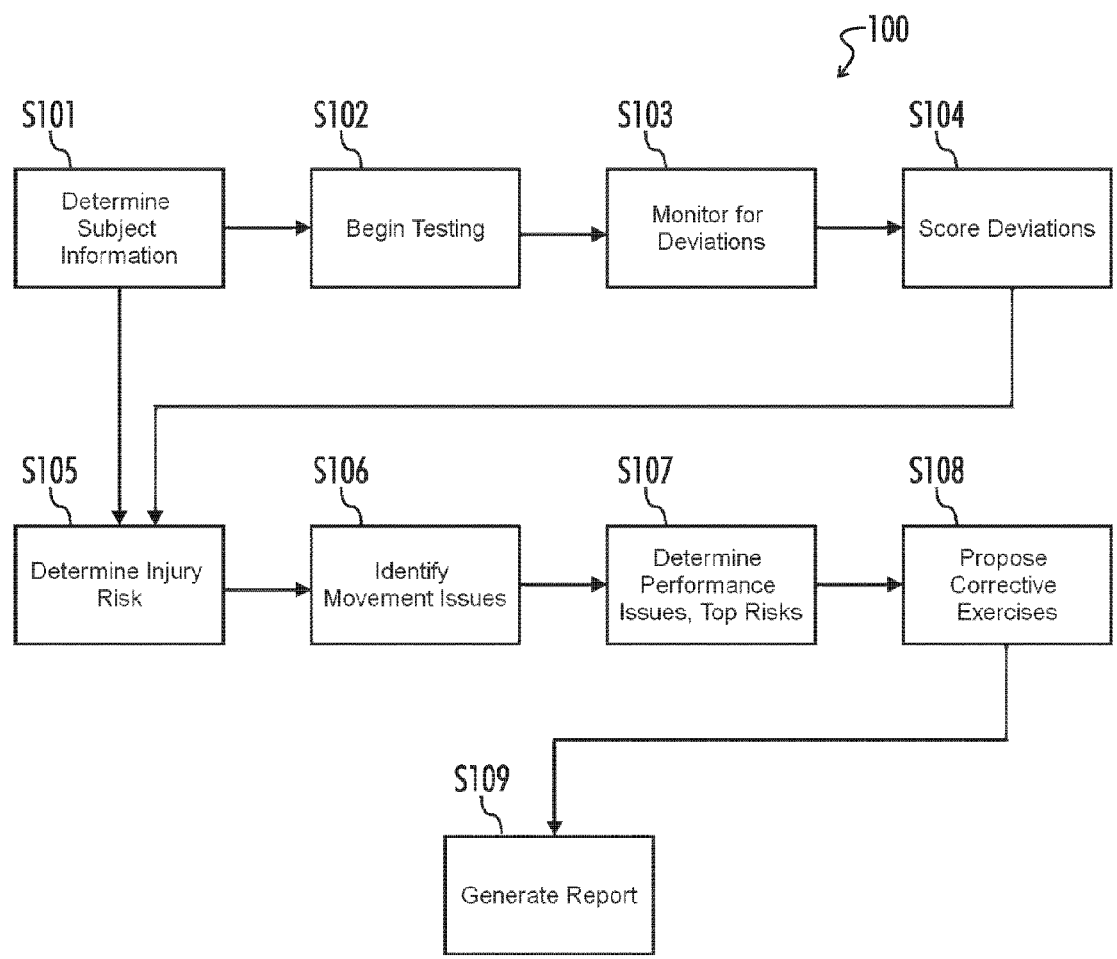
FIG. 2 is a flowchart representing an embodiment of a method according to the present disclosure.

Now referring to FIG. 2, an embodiment of a method according to the present disclosure may be described in association with the system represented in FIG. 1. The method 100 begins at a first step S101 when the system receives input of a subject's personal information. In an embodiment, personal information may be classified as biological information including at least sex, age, and height; and activity information, including at least the sports the user plays and length of time the user has played those sports.

The method proceeds to step S102, wherein the first of a series of one or more activity tests begins. Each test may consist of multiple iterations of a single movement that the subject must perform, or, alternatively, a physical position that the subject must hold, the movement or position designed to test the strength and resilience of a target muscle or muscle group. Ideal embodiments of tests include the FST, SUT, SLST, SLHT, SPTR, and SPTL.

In step S103, the system monitors the subject's performance during the testing iterations for deviations from a predetermined norm. In an embodiment, multiple deviation types may occur for a certain test, the deviation type indicative of a muscular weakness for a certain muscle or muscle group. For example, the system may monitor for lateral deviation indicating a muscular imbalance between legs, for angular deviation of the foot indicating ankle muscle weakness, angular deviation in the leg indicating knee stabilization weakness, and lateral hip adduction indicating quadriceps, hamstring, or core muscle weakness. In a further embodiment, deviations may be categorized in terms of severity of deviation from the determined norm.

Once the test has been completed, or alternatively after all tests have been completed, the system scores each of any determined deviations of each repetition (S104). In a preferred embodiment, scores may range from 0-3 in scale, indicating no deviation to severe deviation accordingly. The system may optionally determine a global score in accordance with the scoring of all iterations of a particular test. Alternatively, the system may optionally determine a global score in accordance with the scoring of pertinent iterations across multiple tests.

Once each deviation has been scored, the system then determines the risk of injury for one or more injury types in accordance with the scored deviations (S105). In an embodiment, the injury types may be determined in accordance with the subject's biological and activity information. The system may select one of a plurality of injury risk assessment algorithms. As types of injuries and risks of injuries differ between ages, sexes, experience, and sports played, multiple and different risk assessment algorithms may be necessary to predictively determine threat of injury specific to the subject. In an embodiment, the system may determine an injury risk algorithm in accordance with the subject's biological and activity information. For example, the system may choose one injury risk algorithm for a 24-year-old female soccer player who has played for 10 years, another injury risk algorithm for a 24-year-old female soccer player who has played for 2 years, another injury risk algorithm for a 36-year-old male football player, and so forth.

In step S106, the system may compare the deviations observed across the multiple tests and determine therefrom possible movement issues. For example, deviations from one test may, when compared with deviations from a second test, indicate a certain type of movement issue. In a more specific example, deviations across multiple tests may indicate an imbalance between abdominal muscles and back muscles that may contribute to core instability that affects the subject's vertical (sagittal) balance. In an alternative example, greater deviations in lateral performance on a subject's left side on multiple leg-oriented tests may indicate a weakness in the subject's left quadriceps (i.e., rectus femoris, vastus medialis, vastus intermedius), indicating an associated movement issue with that muscle group.

In step S107, the system may compare the calculated injury risks and the identified movement issues to determine potential performance issues and associated top risks for the subject. For example, the system may identify, for a male football athlete, lateral movement issues pertaining to single-leg activities (e.g. greater deviations in SLST and SLHT for a certain leg) and injury risks associated with the knee (e.g. tearing of the ACL); the system may then determine and declare weak stabilizing muscles in the weaker leg as a performance issue and an ACL tear in the weaker leg as a top risk. In certain embodiments, the system may determine more than one performance issues and top risks. In further embodiments, the system may rank the performance issues and top risks in accordance with the relative risk of injury. Performance issues may be associated with one or more risks of injury, such that multiple injury types may be at risk from an identified performance issue or multiple performance issues may contribute to a single injury type.

For each determined performance issue and any associated risks of injury, the system may identify and propose corrective exercises for a subject to perform (S108). For example, where the system has identified a movement issue of tight hamstrings that may result in hamstring injury, the system may propose corrective exercises such as hamstring stretches and strengthening of the antagonist quadriceps to improve muscle balance and reduce risk of injury. Proposed exercises may include details such as suggested counterweights, suggested repetitions, suggested duration of performance, and suggested frequency of performance. Proposed exercises may also be suggested in the form of an injury-preventative workout regimen.

In Step S109, the system may generate a report detailing one or more of the identified movement issues, performance issues, top risks, and proposed corrective exercises. The report may be an analog or digital printout of the detailed information. In an alternative embodiment, the report may include dynamic digital content, such as videos of proposed corrective exercises. In a preferred embodiment, the report may include still images of the subject at points of greatest iteration deviations associated with the identified movement issues, the still images overlaid with indicators identifying the degree of deviation. In a further preferred embodiment, the report may include information pertaining to the injury types and instructions for how to perform the corrective exercises.

Figure 3:
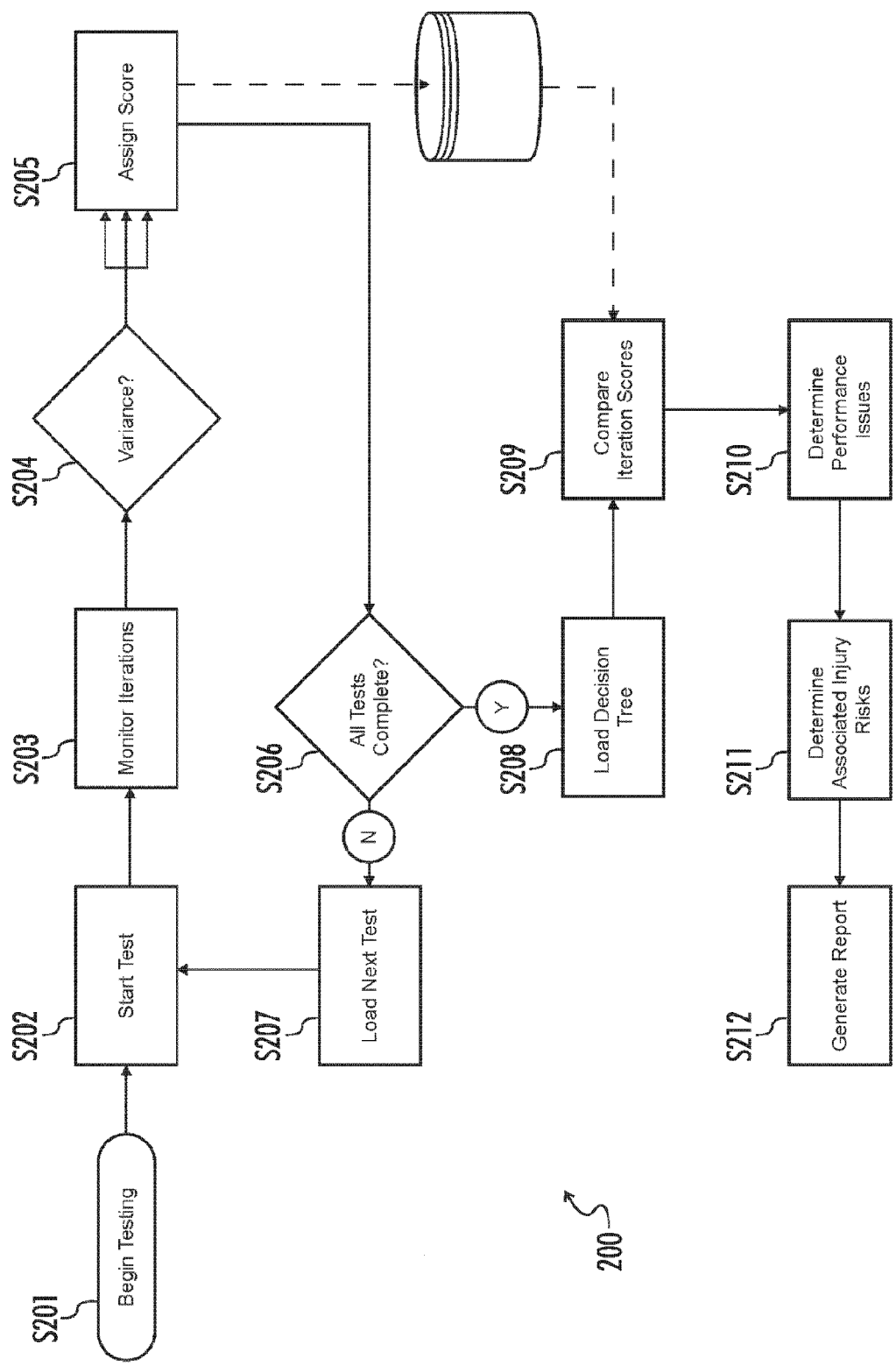
FIG. 3 is a flowchart representing an embodiment of a method for identifying injury risks according to the present disclosure.

FIG. 3 refers to an embodiment of a method for identifying injury risks and may be described in relation to FIGS. 1-2. The method 200 begins at a first step S201 when a user begins a testing regimen for a subject. The system may determine a first test with which to proceed and may load the requisite data for the first test. The system may then proceed to the second step S202 when the test begins and the subject begins performing testing iterations. In certain embodiments, the user may indicate the start of the test by means of user input, whereas in alternative embodiments the system may indicate to the user and subject when the test has commenced and the user should begin performing iterations.

In step S203, the system monitors the user's iterations of the requisite test activity. Monitoring may be periodic or continuous, such as, for example, by means of periodic still photographs or videography respectively.

For each iteration, the system compares the observed iteration to a determined optimal benchmark associated with the certain test to determine whether a variance from the benchmark norm exists (S204). For example, a benchmark may monitor the subject's lateral balance such that the benchmark measures the subject's symmetry to a projected or inferred vertical, center line bisecting the subject relative to the observing device; if a subject leans in a direction during test movement, the system may determine that a variance from the center norm has occurred. In certain embodiments, the system may monitor for deviations associated with a plurality of benchmarks associated with a test, the plurality of benchmarks associated with potential movement issues. For example, the system may monitor a subject's ankle angle and leg angle during a SUT to monitor ankle stabilization strength and knee stabilization strength respectively.

The benchmarks may be associated with one or more threshold values, such that deviations may be categorized according to the severity of the deviation into certain predetermined categories of severity. For example, a deviation with a variance of 1 inch (2.54 cm) may result in a categorization of the deviation as a first value; a deviation with a variance of 2 inches (5.08 cm) may result in a categorization of the deviation as a second value, and so forth.

For each iteration observed, the system may assign a score according to the variance of the iteration and the respective categorization of the deviation (S205). In a preferred embodiment, each iteration may be scored on a linear scale of 0-3, with 0 representing no variance or a deviation variance within an acceptable threshold, 1 representing a minor deviation variance above the minimum threshold, 2 representing a moderate deviation above the minor threshold, and 3 representing a major deviation above the moderate threshold. In an embodiment, the system may store the iteration scores of the subject in a database.

Upon a subject's completion of the first test, the system then determines in step S206 whether any additional tests remain. If any tests of a battery of tests remain, the system proceeds to step S207 where it may load the next test and any requisite data for observing the next test's iterations. The next test then proceeds in accordance with steps S202-S206 as described prior.

Once all tests have been complete, the system proceeds to step S208, whereupon it selects a decision algorithm for purposes of identifying injury risks. In a preferred embodiment, the system may select one or more of a plurality of decision algorithms in accordance with the subject information entered in step S101. For example, one decision algorithm may be selected for an adult male basketball player, and another decision algorithm may be selected for a juvenile female tennis player, the respective algorithms weighted to determine most likely injuries relative to the subject information of age, sex, height, weight, sport played, experience, and the like.

Once a decision algorithm has been selected, the system compares the iteration scores of all observed tests for purposes of identifying potential performance issues (S209). In an exemplary embodiment, the system may employ one or more algorithms effective to determine, given a particular arrangement of deviation scores for known testing procedures, potential performance issues by associating high scores in certain iterations across multiple tests with known performance issues. For example, an increase in deviation scores in later iterations of certain tests may be associated with underdeveloped core muscle strength. After or in conjunction with comparing iteration scores from multiple tests, the system determines potential performance issues a subject may have (S210). In certain embodiments, performance issues may be ranked according to severity or risk of serious injury that may result.

Upon identifying the subject's performance issues, the system then determines injury risks associated with said performance issues (S211). In a preferred embodiment, the injury risks are determined from the algorithm selected in step S208 such that injuries more pertinent to the subject based on the subject's biological information and activities performed are identified. In certain embodiments, injury risks may be ranked according to the severity of injury.

Upon determination of the subject's performance issues and injury risks, the system generates a report detailing said performance issues and injury risks (S212).

Figure 4:
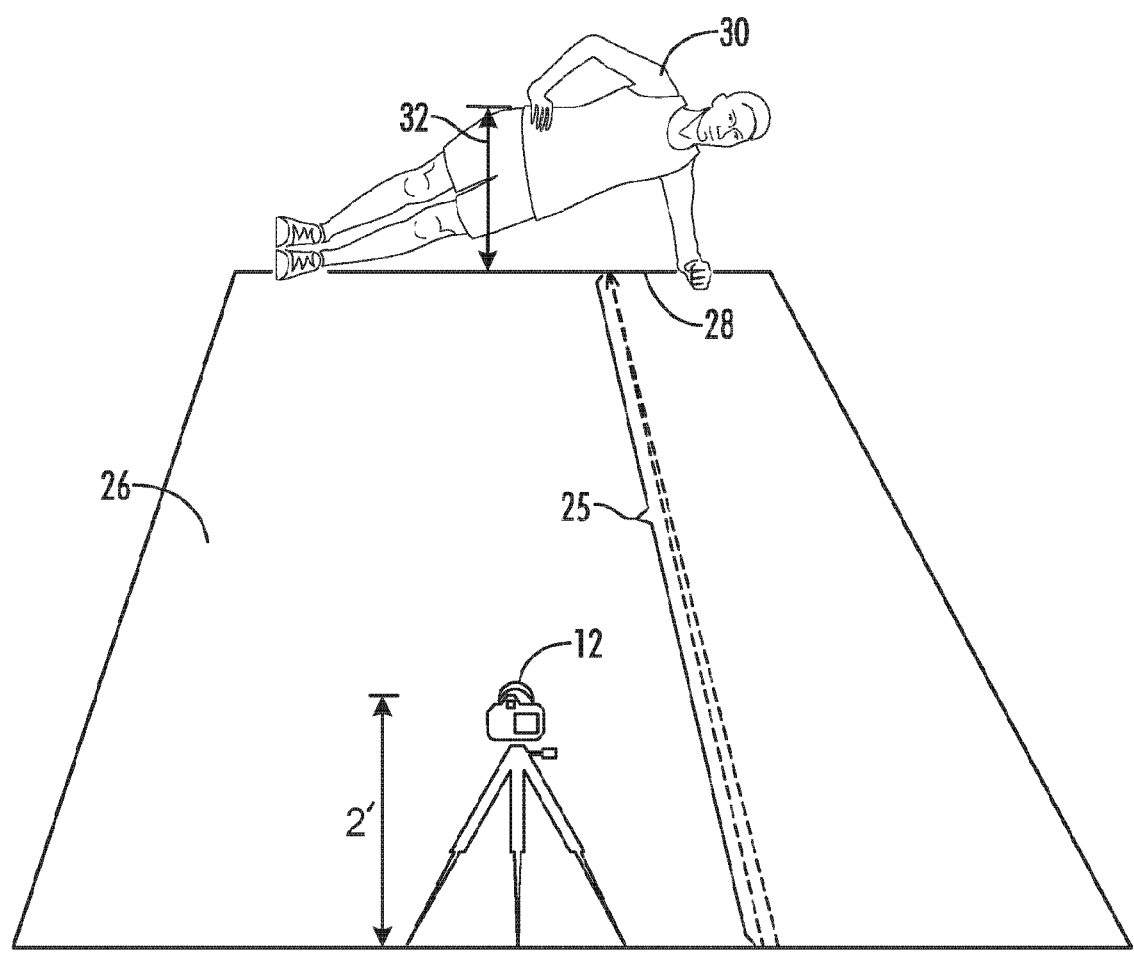
FIG. 4 is a depiction of an image capture device setup for monitoring a subject according to the present disclosure.

Now referring to FIG. 4, an embodiment of image capture device setup for monitoring a subject may be described in relation to FIGS. 1-3. In an embodiment, the image capture device 12 may be set level upon a horizontal surface such as a floor, a table, or stand. The image capture device 12 may optionally include leveling devices such as tripod legs. In preferred embodiments, the image capture device 12 may be at minimum two feet (0.61 m) from the floor surface 26.

The image capture device 12 may be directed at a reference line 28. The reference line may serve as a reference point for the software 20 of system 10 to monitor for subject deviations in iteration performance in accordance with step S103. The reference line 28 may ideally be a tape, chalk, or other straight, visible line exactly 12 inches (0.30 m) in length affixed to or drawn upon the floor surface 26. In further ideal embodiments, the floor surface 26 may be a flat, level, hard surface such as a hardwood or concrete floor, as soft surfaces may affect pathokinematics and measuring performance thereof.

A subject 30 may perform the various tests and test iterations in relation to the reference line 28. For example, FST, SLST, and SLHT may be performed with a subject's feet standing on or immediately behind the reference line 28, the subject 30 performing ideally at the midpoint of the line so as to remain symmetrical in reference to the image capture device 12. In another example, the SUT may be performed with a step, not shown, upon which the subject 30 will step, placed on and parallel to the reference line 28; the step may range in height from 8 inches (0.20 m) to 12 inches (0.30 m) or greater and may be embodied in the form of a standard clinic step or a plyometric step. In yet another example, the PT and SPT may be performed with a subject's forearm or forearms placed on one side of the reference line 28 and the subject's hips located above the other side of the reference line 28. FIG. 4 depicts a subject 30 performing the SPT in accordance with the third example.

The software 20 of system 10 may be effective to determine a reference line 32 in accordance with the test being performed and relative to the ideal position of the subject 30. The reference line 32 may serve as a benchmark for determining a user's deviations therefrom during test iterations in accordance with step S103. For example, the system 10 may determine a reference line in accordance with the subject 30's SPT position between the floor surface 26 as relative to the horizontal axis of the reference line 32 and the subject 30's uppermost hip. In certain embodiments, the reference line 32 may be determined by the system 10 in accordance with observed positioning at the beginning of testing. In alternative embodiments, the reference line 32 may be predetermined by the software 20 or determined in accordance with subject information.

The system 10 may monitor a subject 30's iterative performance in reference to the reference line 32 in accordance with the images captured by the image capture device 12 and determine if deviations are occurring. For example, for a subject performing the SPT, the system 10 may monitor a subject 30's uppermost hip height in relation to the reference line 32 and, when the subject 30's uppermost hip dips at least one inch (2.54 cm) below the reference line, determine that a deviation has occurred. Certain embodiments may include more than one reference line 32 for purposes of determining various types of deviations indicative of various movement issues.

The previous detailed description has been provided for the purposes of illustration and description. Thus, although there have been described particular embodiments of a system and method, it is not intended that such references be construed as limitations upon the scope of an invention as disclosed herein except as set forth with specificity in the following claims.

What is claimed is:

1. A system for dynamic movement assessment, the system comprising:
   one or more servers defining a hosted server network, one or more of the servers in the hosted server network further comprising a non-transitory computer readable medium having program instructions executable by a processor to direct the performance of operations comprising:
   processing image data with respect to a predetermined plurality of movement patterns performed by a subject, the movement patterns performed in a predetermined sequence and for a predetermined number of iterations, each pattern associated with one or more variable components;
   scoring each iteration of each movement pattern with respect to observable deviations from a threshold value associated with each respective variable component, the score based on a magnitude of deviation and a quantity of deviations;
   probabilistically identifying a causal relationship between one or more movement issues and criteria selected from a list comprising one or more of the deviations and the iteration scores; and
   generating a report comprising one or more intervention actions associated with the causal relationship.

2. The system of claim 1, further comprising an operation of executing one or more injury risk assessment algorithms to predictively determine the risk of injury from one or more injury types in accordance with an observable deviation score.

3. The system of claim 2, the one or more injury risk assessment algorithms selected from a plurality of injury risk assessment algorithms based on at least demographic data comprising biological information and activity information associated with the subject, the activity information comprising a type of activity and an amount of time the subject has been involved in the type of activity.

4. The system of claim 2, wherein each of the one or more variable components for each movement pattern are associated with a certain muscle or muscle group, and
   wherein the observable deviations from a threshold value associated with each respective variable component further are indicative of a muscular weakness for the associated muscles or muscle groups.

5. The system of claim 4, wherein the operation of probabilistically identifying causal relationships comprises
   comparing deviations observed across a plurality of movement patterns to determine the existence of one or more possible movement issues corresponding to the associated muscles or muscle groups.

6. The system of claim 5, wherein the operation of probabilistically identifying causal relationships comprises
   comparing the determined movement issues and the determined risk of injury from the one or more injury types to determine potential performance issues; and
   ranking potential performance issues in accordance with relative risks for one or more injury types.

7. The system of claim 6, wherein the operation of generating a report comprising one or more intervention actions associated with the causal relationship comprises
   identifying an intervention action associated with one or more of a determined movement issue, a potential performance issue and an injury type, and
   generating a report including dynamic digital content corresponding to the intervention action,
   wherein the dynamic digital content comprises display of one or more images of the subject indicating an observed deviation from the plurality of iterations.

8. The system of claim 6, wherein the potential performance issues are determined by associating high scores across defined chronological iterations with known performance issues.

9. The system of claim 6, wherein each deviation score is further based on a magnitude of a weighted critical deviation as determined for the respective iteration of each movement pattern.

10. The system of claim 9, wherein each deviation score is further based on the quantity of deviations as compared to a threshold number of deviations in addition to the weighted critical deviation.

11. The system of claim 6, wherein at least one of the observable deviations comprises an asymmetry of motion.

12. The system of claim 11, wherein the system further identifies whether or not a weakness associated with the asymmetry of motion occurs in eccentric or concentric phases of the motion.

13. The system of claim 9, wherein the operation of probabilistically identifying causal relationships comprises a comparison of one or more current scores with respective and previously obtained scores.

14. The system of claim 13, wherein the predetermined plurality of movement patterns performed by the subject comprise a full squat test, a step-up test, a single leg squat test, a single leg hop test, a plank test and a side plank test.

15. A system for dynamic movement assessment, the system comprising:
  an image capture device;
  a user computing device associated with the image capture device and configured to receive image data associated with a live video feed, the user computing device comprising a non-transitory computer readable medium having program instructions executable by a processor to direct the performance of operations further comprising
    processing the image data with respect to a predetermined plurality of movement patterns performed by a subject, the movement patterns performed in a predetermined sequence and for a predetermined number of iterations, each pattern associated with one or more variable components;
    scoring each iteration of each movement pattern with respect to observable deviations from a threshold value associated with each respective variable component, the score based on a magnitude of deviation and a quantity of deviations;
    probabilistically identifying a causal relationship between one or more movement issues and criteria selected from a list comprising one or more of the deviations and the iteration scores; and
    generating a report comprising one or more intervention actions associated with the causal relationship.

16. The system of claim 15, further comprising an operation of executing one or more injury risk assessment algorithms to predictively determine the risk of injury from one or more injury types in accordance with an observable deviation score,
  wherein each of the one or more variable components for each movement pattern are associated with a certain muscle or muscle group, and
  wherein the observable deviations from a threshold value associated with each respective variable component further are indicative of a muscular weakness for the associated muscles or muscle groups.

17. The system of claim 16, wherein the operation of probabilistically identifying causal relationships comprises
  comparing deviations observed across a plurality of movement patterns to determine the existence of one or more possible movement issues corresponding to the associated muscles or muscle groups.

18. The system of claim 17, wherein the operation of probabilistically identifying causal relationships comprises
  comparing the determined movement issues and the determined risk of injury from the one or more injury types to determine potential performance issues; and
  ranking potential performance issues in accordance with relative risks for one or more injury types.

19. The system of claim 18, wherein the operation of generating a report comprising one or more intervention actions associated with the causal relationship comprises
  identifying an intervention action associated with one or more of a determined movement issue, a potential performance issue and an injury type, and
  generating a report including dynamic digital content corresponding to the intervention action,
  wherein the dynamic digital content comprises display of one or more images of the subject indicating an observed deviation from the plurality of iterations.

20. The system of claim 18, wherein each deviation score is further based on a magnitude of a weighted critical deviation as determined for the respective iteration of each movement pattern, and the quantity of deviations as compared to a threshold number of deviations in addition to the weighted critical deviation.

* * * * *